H. M. SCHLOSS.
AUTOMOBILE WHEEL.
APPLICATION FILED NOV. 29, 1913.

1,234,394.

Patented July 24, 1917.
2 SHEETS—SHEET 1.

WITNESSES

INVENTOR
H. M. Schloss
ATTORNEY

H. M. SCHLOSS.
AUTOMOBILE WHEEL.
APPLICATION FILED NOV. 29, 1913.

1,234,394.

Patented July 24, 1917.
2 SHEETS—SHEET 2.

WITNESSES
G. E. Sterritte
N. L. Sterritte

INVENTOR
H. M. Schloss
BY
Arthur Phelps Marr
ATTORNEY

UNITED STATES PATENT OFFICE.

HARRY MARTIN SCHLOSS, OF NEW YORK, N. Y.

AUTOMOBILE-WHEEL.

1,234,394.     Specification of Letters Patent.     Patented July 24, 1917.

Application filed November 29, 1913. Serial No. 803,664.

*To all whom it may concern:*

Be it known that I, HARRY M. SCHLOSS, a citizen of the United States, and resident of the borough of Manhattan, city, county, and State of New York, have invented certain new and useful Improvements in Automobile-Wheels, of which the following is a specification.

The device, the subject of this invention is intended as an improvement in the construction of an automobile wheel, or rather in the tire holding rim thereof, an improvement that is intended to allow a tire to be removed from or placed upon a rim and in operable position without the necessity of wedging or prying the tire over a portion of the rim, an operation that often results in the destruction of the shoe or of the inner tube.

I am well aware that rims are in use the whole of one side of which is removable and I am well aware that other constructions such as demountable rims and auxiliary wheels have been produced to expedite the substitution of a tire but I have learned from experience that auxiliary wheels and demountable rims are objectionable because of the great additional weight that it is necessary to carry and because it requires some mechanical skill to make the substitution or to properly adjust the parts.

In my device I have overcome the objectionable features and have made improvements that I believe are new, novel and important.

The following is what I consider the best means of carrying out this invention.

The accompanying drawings form a part of this specification, in which:—

Similar reference numerals indicate like parts in all the figures where they appear.

Figure 1:
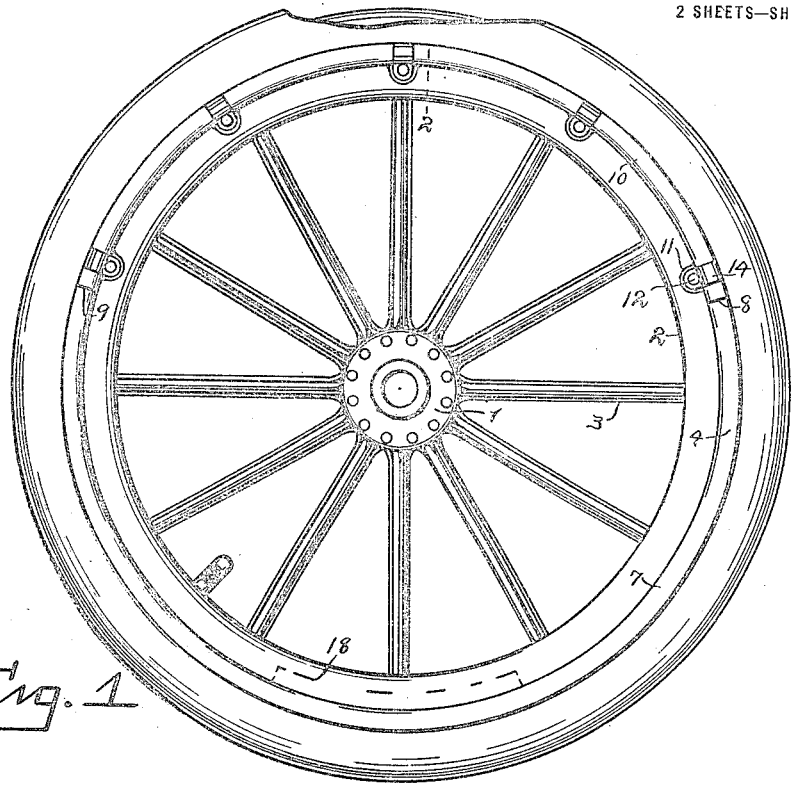
Figure 1 shows in elevation a completed wheel equipped with my improvement.

In Fig. 1, I have shown an ordinary wheel having a hub 1, a felly 2, and spokes 3 of ordinary construction, design and size. Exterior to the felly 2 I have arranged a rim 4, which may be secured to the felly in an ordinary manner and this rim may be patterned after any of the standard designs such as those adapted to operate with clencher, quick detachable or any other well known tire. The inner upwardly projecting flange of the rim 4 may be formed integral with the rim as shown at 5, and the lower portion of the outer flange of the rim may also be formed integral with the rim as indicated at 7. Between the lines 8 and 9 I have omitted the ordinary flange and into this space I fit a removable piece 10, the inner face of which may be formed similar to the flanges thus far described but the outer face of which has a plurality of lugs or a downward projection as shown at 11, each of these lugs is perforated and through the perforation I pass a bolt 12, which bolt will pass through the felly and through a pressure plate 13 arranged at the opposite side of the felly.

Figure 2:
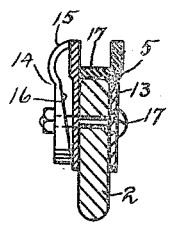
Fig. 2 is a section on the line 2 in Fig. 1.

Under each of the bolts 12 and secured in position thereby I arrange a lug 14 shown in detail in Fig. 2. The upper end of each of the lugs 14 is arched as shown at 15 and the inner face of each lug is finished at an angle as shown at 16. By means of this arch and angle of the lug 14 I am enabled to compress the removable member 10 firmly in position and to retain it there, even under the roughest and most trying operative conditions.

It will be noted that the removable portion 10 consists of a little less than one half of the circumference of the outer rim. This is intentional as a tire may be placed into the rim upon the lower side of the wheel without difficulty and when over one half of the tire has been placed in position between the two sides of the rim it will be held there with sufficient security to allow an easy and unhampered manipulation of the remainder without undue strain of the tire or rim. As the portion 10 is removed before a tire is to be placed in position, the tire can be slid onto the face 17 of the rim without difficulty and when it has been caused to assume its proper position on this face the portion 10 can be firmly bolted without chance of injury to the tire or to the rim or felly.

Figure 3:
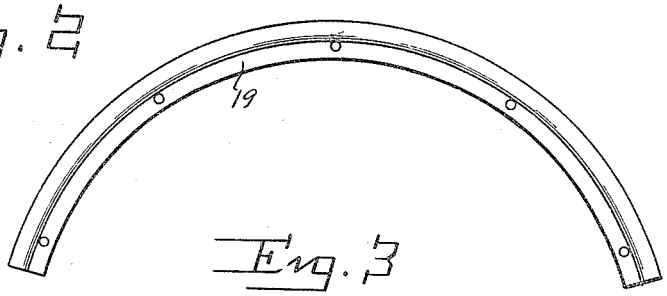
Fig. 3 shows a substitute part of a somewhat different outline.
Figure 4:
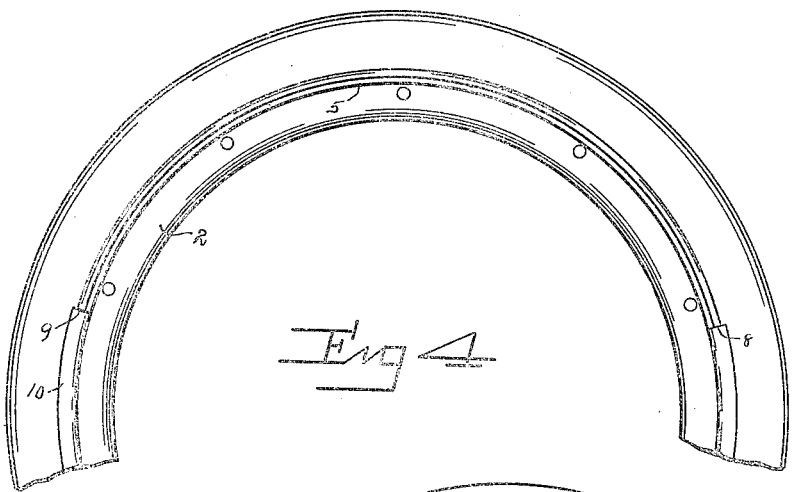
Fig. 4 shows a portion of the wheel with my improved part removed.
Figure 5:
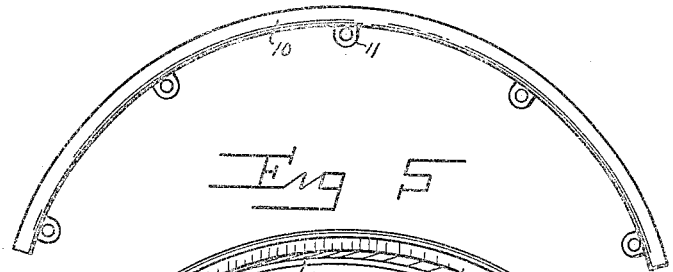
Fig. 5 is a detail of the removable part as shown in Fig. 1.
Figure 6:
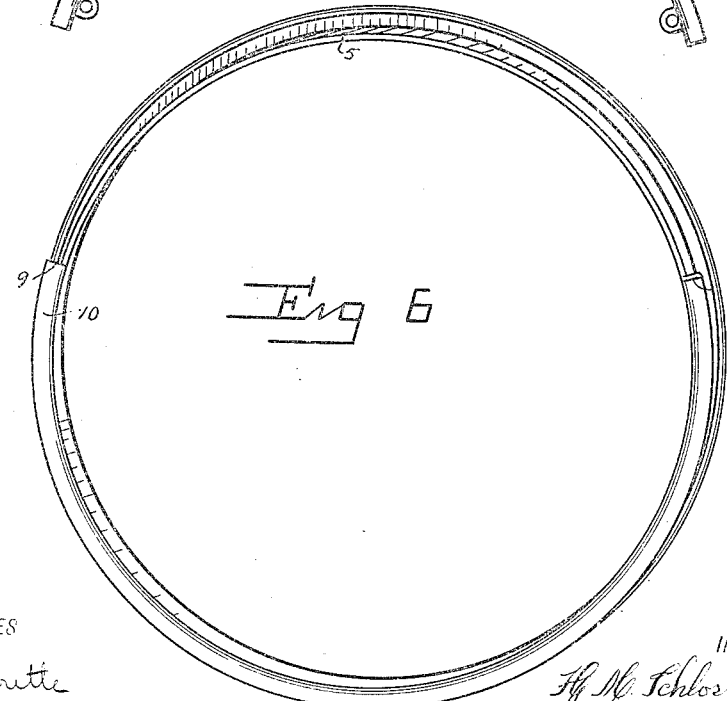
Fig. 6 shows the flange with the removable part omitted.

The part 10 as shown in Fig. 1, is provided with a plurality of lugs 11, but in Fig. 3 I have shown a downwardly depending and perforated flange 18 which will act as a substitute for the lugs 11. The use of this flange may be advantageous as I have found that if the flange be of sufficient stiffness it will hold the removable part with sufficient secureness even without the use of the lugs or clamps 14.

In connection with the construction I have already described the method for placing a tire upon the rim I will now describe how a tire is removed. It is presumed that before a tire is removed it is partly deflated either through accident or intent, then a wrench is applied to the nuts upon the bolts 12 and the nuts are removed, the bolts may be then withdrawn from the felly and from the member 10 and the clamps or lugs 14 which will be loosened by the removal of the bolt may now be removed. This will free the member 10 and that portion may be lifted off and laid aside. The upper portion of the tire, that part that engages the rim between the lines 8 and 9 may now be readily slid from position upon the rim and the removal of this part of the tire will relieve the tension of the tire to a sufficient extent to allow the tire to be readily disengaged from the remainder, the lower portion of the clamping flanges. Then by a reversal of these operations another tire may be placed in position or the same tire may be replaced after the necessary repairs have been made. It will be observed that each of these operations is simple and that they may be performed in a most rapid manner even by an operator having but a limited mechanical knowledge.

I have shown a plate 13 which will receive the pressure from the bolt or nut and in this plate I have shown a squared hole 17 for the reception of a squared portion of the bolt, it is obvious however that this plate may be omitted and that the squared recess for the shoulder of the bolt may be produced directly in the felly 2.

So that I may obtain a perfect balance of the wheel when assembled I may provide a plate or counterweight 18 arranged approximately as shown by the dotted lines, the purpose of this counterweight being to balance the additional weight incident to the use of the lugs 11 or flange 18 and the nuts and bolts necessary to secure these parts. This counterweight may be placed upon the inner or outer face of the felly diametrically opposite the removable portion 10 and may be of any desirable shape or size.

Modifications may be made within the scope of the appended claim without departing from the principle or sacrificing the advantages of this invention.

Having carefully and fully described my invention what I claim and desire to secure by Letters Patent is:—

An automobile wheel having a rim, a flange projecting from a portion of the periphery of said rim, a removable member adapted to complete the said projecting rim said removable member having a plurality of perforated lugs projecting over and parallel to the felly of said wheel a bowed clamp adjacent to each said lug and having one end upon said lug and the other end bearing upon the projecting portion, of said removable member adjacent to said lug, for securing said removable member to said wheel for the purpose set forth.

Signed at New York city, in the county and State of New York this 20 day of Nov., 1913.

HARRY MARTIN SCHLOSS.

Witnesses:
G. E. STERRETTE,
ARTHUR PHELPS MARR.